(12) United States Patent
Nguyen

(10) Patent No.: US 6,425,054 B1
(45) Date of Patent: Jul. 23, 2002

(54) MULTIPROCESSOR OPERATION IN A MULTIMEDIA SIGNAL PROCESSOR

(75) Inventor: Le Trong Nguyen, Monte Sereno, CA (US)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/685,982

(22) Filed: Oct. 10, 2000

Related U.S. Application Data (63) Continuation of application No. 08/697,102, filed on Aug. 19, 1996, now abandoned.

(51) Int. Cl.⁷ .......................... G06F 12/08; G06F 13/00
(52) U.S. Cl. ...................................... 711/117; 711/118
(58) Field of Search .................................. 711/117, 118, 711/130, 140, 147, 149; 712/1–9, 24, 29, 32–35; 345/501–506, 514–522; 710/131, 132

(56) References Cited

U.S. PATENT DOCUMENTS

| | | | |
|---|---|---|---|
| 4,300,763 A | * 11/1981 | Barr | 434/236 |
| 4,349,871 A | * 9/1982 | Lary | 711/138 |
| 4,394,540 A | 7/1983 | Willis et al. | 379/106.06 |
| 4,541,046 A | 9/1985 | Nagashima et al. | 712/3 |
| 4,888,679 A | 12/1989 | Fossum et al. | 395/800.02 |
| 4,991,083 A | 2/1991 | Aoyama et al. | 712/3 |
| 5,040,109 A | 8/1991 | Bowhill et al. | 712/34 |
| 5,263,144 A | 11/1993 | Zurawski et al. | 711/121 |
| 5,293,602 A | 3/1994 | Fukagawa et al. | 711/147 |
| 5,418,973 A | 5/1995 | Ellis et al. | 711/3 |
| 5,423,051 A | * 6/1995 | Fuller et al. | 712/7 |
| 5,469,561 A | * 11/1995 | Takeda | 713/600 |
| 5,502,683 A | 3/1996 | Marchioro | 395/230.05 |
| 5,511,217 A | 4/1996 | Nakajima et al. | 712/2 |
| 5,546,586 A | 8/1996 | Wetmore et al. | 395/700 |
| 5,551,010 A | 8/1996 | Lino et al. | 711/169 |
| 5,615,343 A | 3/1997 | Sarangdhar et al. | 710/39 |
| 5,644,756 A | 7/1997 | Harwood, III | 395/311 |
| 5,666,510 A | 9/1997 | Mitsuishi et al. | 711/220 |
| 5,669,010 A | 9/1997 | Duluk, Jr. | 712/222 |
| 5,768,609 A | 6/1998 | Gove et al. | 395/800.11 |
| 5,822,606 A | 10/1998 | Morton | 395/800.24 |
| 5,930,522 A | * 7/1999 | Fant | 712/25 |
| 5,949,439 A | 9/1999 | Ben-Yoseph et al. | 345/503 |

OTHER PUBLICATIONS

Single Chip Gives Home PC's HDTV–Quality Movies . . . Business Wire, Oct. 9, 1995.

Foley, P. "The Mpact® Media Processor redefines the multimedia PC." Proceedings of Compcon '96. Feb. 25–28, 1996: 311–318.

Rathnam, S.; Slavenburg, G. "An Architectural Overview of the Programmable Multimedia Procesor, TM–1." Proceedings of COMPCON '96. Feb. 25–28, 1996: 319–326.

TMS320C8X System–Level Synopsys, Texas Instrument Inc. Sep. 1995. [Online] Available: http://wwww–s.ti.com/sc/psheets/spru113b/spru113.pdf.

* cited by examiner

*Primary Examiner*—Do Hyun Yoo
*Assistant Examiner*—Yamir Encarnacion
(74) *Attorney, Agent, or Firm*—Skjerven Morrill LLP (57) ABSTRACT

To achieve high performance at low cost, an integrated digital signal processor uses an architecture which includes both a general purpose processor and a vector processor. The integrated digital signal processor also includes a cache subsystem, a first bus and a second bus. The cache subsystem provides caching and data routing for the processors and buses. Multiple simultaneous communication paths can be used in the cache subsystem for the processors and buses. Furthermore, simultaneous reads and writes are supported to a cache memory in the cache subsystem.

10 Claims, 8 Drawing Sheets

MULTIPROCESSOR OPERATION IN A MULTIMEDIA SIGNAL PROCESSOR

CROSS-REFERENCE TO RELATED APPLICATION

This application is a continuation of U.S. patent application Ser. No.: 08/697,102 filed Aug. 19, 1996, entitled "Multiprocessor Operation in a Multi-Media Signal Processor", now abandoned.

This patent document is related to and incorporates by reference, in their entirety the following concurrently filed patent applications:

U.S. patent application Ser. No. 08/699,579 entitled "Single-Instruction-Multiple-Data Processing in a Multimedia Signal Processoris" now U.S. Pat. No. 6,058,465, U.S. patent application Ser. No. 08/699,294 entitled "Efficient Context Saving and Restoring in Multi-Tasking Computing System Encironment" now U.S. Pat. No. 6,061,711

U.S. patent application Ser. No. 08/699,295, entitled "System and Method for Handling Software Interrupts with Argument Passing" now U.S. Pat. No. 5,996,058;

U,S, patent application Ser. No. 08/699,294, entitled "System and Method for Handling Interrupts and Exception Events in an Asymmetric Multiprocessor Architecture" now U.S. Pat. No. 6,003,129;

U.S. patent application Ser. No. 08/699,303, entitled "Methods and Apparatus for Processing Video Data" now abandoned;

U.S. patent application Ser. No. 08/697,086, entitled "Single-Instruction-Multiple-Data Processing Using Multiple Banks of Vector Registers" now U.S. Pat. No. 5,838,984; and U.S. patent application Ser. No. 08/699,585, entitled "Single-Instruction-Multiple-Data Processing with Combined Scalar/Vector Operations" now abandoned.

BACKGROUND OF THE INVENTION

1. Field of the Invention

This invention relates to digital signal processors and particularly to dual-threaded, asymmetric parallel processing systems which include a general purpose processor and a vector processor for manipulation of vector data.

2. Description of Related Art

A variety of digital signal processors (DSPs) are used in multimedia applications such as coding and decoding of video, audio, and communications data. One type of digital signal processor (DSP) has dedicated hardware to address a specific problem such as MPEG video decoding or encoding. Dedicated hardware DSPs generally provide high performance per cost but are only usable for specific problems and unable to adapt to other problems or changes in standards.

Programmable DSPs execute programs which solve multimedia problems and provide greater flexibility than dedicated hardware DSPs because changing software for a programmable DSP can change the problem solved. A disadvantage of programmable DSPs is their lower performance per cost. A programmable DSP typically has an architecture similar to that of a general purpose processor and a relatively low processing power. The low processing power generally results from an attempt to minimize cost. Thus, such a DSP is not a wholly satisfactory because a low power DSP hampers the DSP's ability to address the more complex multimedia problems such as real-time video encoding and decoding.

Since a goal for a programmable DSP is to provide high processing power to address multimedia problems at a minimum cost, one could incorporate into such a DSP parallel processing, which is one known way to increase processing power. One architecture for parallel processing is a "very long instruction word" (VLIW) DSP, which is characterized by a large number of functional units, most of which perform different, but relatively simple tasks. A single instruction for a VLIW DSP may be 128 bytes or longer and has separate parts. The parts can be executed by separate functional units in parallel. VLIW DSPs have high computing power because a large number of functional units can operate in parallel. VLIW DSPs also have relatively low cost because each functional unit is relatively small and simple. A problem for VLIW DSPs, however, is inefficiency in handling input/output control, communication with a host computer, and other functions that do not lend themselves to parallel execution in the functional units of the VLIW DSP. Additionally, programs for VLIW differ from conventional computer programs and can be difficult to develop because of lack of programming tools and programmers familiar with VLIW software architectures.

SUMMARY OF THE INVENTION

In accordance with the invention, an integrated digital signal processor is disclosed. The digital signal processor combines a general purpose processor with a vector processor, which is capable of operating in parallel with the general purpose processor. The integrated digital signal processor is able to achieve high performance with low cost since the two processors perform only tasks ideally suited for each processor. For example, the general purpose processor runs a real time operating system and performs overall system management while the vector processor is used to perform parallel calculations using data structures called "vectors". A vector is a collection of data elements typically of the same type.

In one embodiment, the digital signal processor also includes a cache subsystem, a first bus, and a second bus. The first bus is used for high speed devices such as a local bus interface, a DMA controller, a device controller, and a memory controller. The second bus is used for slow speed devices such as a system timer, a UART, a bit stream processor, and an interrupt controller.

The cache subsystem combines caching functions with switchboarding, or data routing, functions. The switchboard functions allow multiple communication paths between the processors and buses to operate simultaneously. Furthermore, the cache portion of the cache subsystem allows simultaneous reads and writes into the cache memory.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a multimedia processor includes a general purpose processor and a vector processor which operate in parallel according to separate program threads. The general purpose processor, like most conventional general purpose processors, executes instructions which typically manipulates scalar data. Such processors are suited for execution of input/output (I/O) and control functions. In some embodiments, the general purpose processor has a limited vector processing capability of several byte-size data elements packed into one data word. For example, if the general purpose processor is a 32-bit processor, some embodiments of the general purpose processor can process four one-byte data elements simultaneously. However, multimedia computing such as audio and video data compression and decompression requires many repetitive calculations on pixel arrays and strings of audio data. To perform real-time multimedia operations, a general purpose processor which manipulates scalar data (e.g. one pixel value or sound amplitude per operand) or only small vectors must operate at a high clock frequency. In contrast, the vector processor executes instructions where each operand is a vector containing multiple data elements (e.g. multiple pixel values or sound amplitudes). Therefore, the vector processor can perform real-time multimedia operations at a fraction of the clock frequency required for a general purpose processor to perform the same function.

Thus, by allowing an efficient division of the tasks required for a multimedia application, the combination of programmable general purpose and vector processors provides high performance per cost. In one embodiment of the invention, the general purpose processor executes a real-time operating system designed for a media circuit board ("card") communicating with a host computer system. The real-time operating system communicates with a primary processor of the computer system, services I/O devices on or coupled to the card, and selects tasks which the vector processor executes. In that embodiment, the vector processor is designed to perform the computationally intensive tasks requiring manipulation of large data blocks, while the general purpose processor acts as the master processor to the vector processor. Program threads for each processor are written using a conventional instruction set which makes the multimedia processor "programmer-friendly". Programmability permits the multimedia processor to perform a variety of different multimedia tasks. The multimedia processor can, for example, be adapted to a new protocol simply by changing either its application programs or its firmware. In one embodiment, the instructions set is similar to that of a conventional reduced instruction set computer (RISC) instruction set.

In accordance with another aspect of the invention, the general purpose processor and the vector processor share a variety of on-chip and off-chip resources which are accessible through a single address space. A cache subsystem which implements separate data and instruction caches for each processor also provides a switchboard type connection between local memory and resources such as a bitstream processor, a universal asynchronous receiver-transmitter ("UART"), a direct memory access ("DMA") controller, a local bus interface, and a coder-decoder ("CODEC") interface which are memory mapped devices. The cache subsystem can use a transaction-oriented protocol which implements a switchboard for data access among the processors and memory mapped resources.

Figure 1:
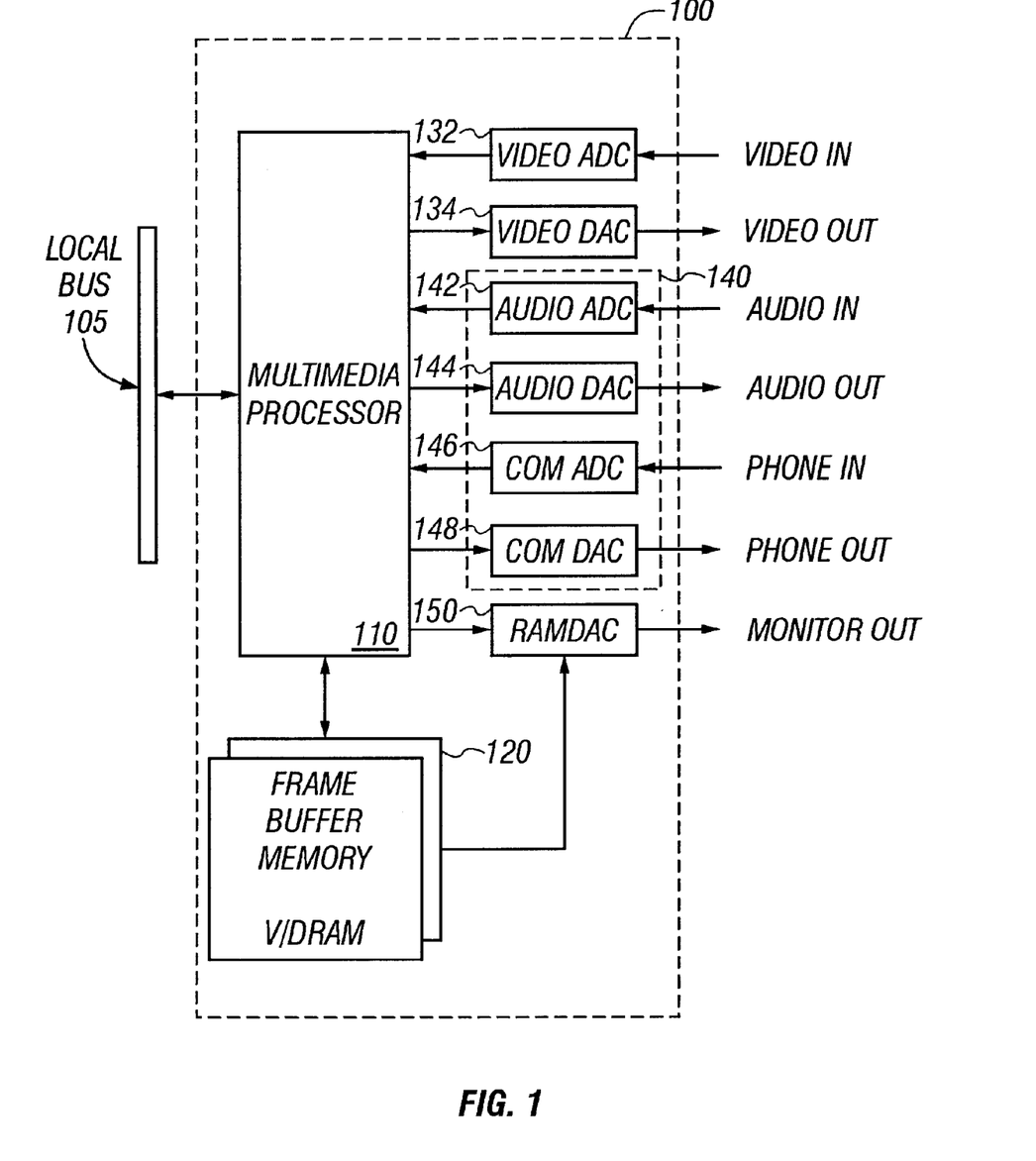
FIG. 1 shows a block diagram of a multimedia card in accordance with an embodiment of the invention.

FIG. 1 shows a multimedia card 100 in accordance with an embodiment of the invention. Multimedia card 100 includes a printed circuit board, a multimedia processor 110, and a connector which attaches to a local bus 105 of a host computer system. In an exemplary embodiment, local bus 105 is a PCI bus; but in other embodiments, local bus 105 could be a proprietary bus or a bus which conforms to any desired protocol such as the ISA or VESA bus protocols.

Multimedia processor 110 uses a local memory 120, also located on multimedia card 100, for storage of data and program instructions. Local memory 120 may also act as a frame buffer for video coding and decoding applications. In the exemplary embodiment, local memory 120 can be implemented by a 512K by 32-bit synchronous dynamic random access memory (DRAM). Portions of the local memory space can also be implemented by on-chip static random access memory ("SRAM") and read-only memory ("ROM") in multimedia processor 110. In fact, if on-chip memory is sufficient to hold the data and instructions of multimedia card 100, local memory 120 need not be implemented.

In addition to multimedia processor 110 and local memory 120, multimedia card 100 includes a video analog-to-digital converter (ADC) 132, a video digital-to-analog converter (DAC) 134, an audio ADC 142, an audio DAC 144, a communications ADC 146, and a communications DAC 148. Each of converters 132, 134, 142, 144, 146, and 148 can be implemented by one or more separate integrated circuits. Alternatively, two or more of converters 132, 134, 142, 144, 146, and 148 can be integrated on a single integrated circuit. A single integrated circuit 140, for example, the AD1843 available from Analog Devices, Inc., can implement the functions of converters 142, 144, 146, and 148.

Video ADC 132, which may be implemented by, for example, a KS0122 integrated circuit available from Samsung Semiconductor, Inc., connects to a video camera or other source of a video signal and digitizes the video signal into a series of pixel values. Multimedia card 100 compresses or encodes the pixel values according to a video encoding standard such as MPEG, JPEG, or H.324 implemented in the firmware executed by multimedia processor 110. The encoded video data can then be transmitted to the host computer via local bus 105, to a device such as an Ethernet card coupled to local bus 105, or to be further encoded for transmission on a telephone line coupled to communication DAC 148.

Video DAC 134 converts a series of digital samples from multimedia processor 110 into an analog video signal for a video monitor or television. Video DAC 134 may be implemented, for example, by a KS0119 integrated circuit available from Samsung Semiconductor, Inc., according to an NTSC or PAL video standard. Multimedia processor 110 can generate the series of digital samples for video DAC 134 based on data received from the host computer, another device coupled to local bus 105 a video camera coupled to video ADC 132, or a telephone line coupled to communication ADC 146.

An optional component of multimedia card 100 is a graphics controller 150 which shares local memory 120 with multimedia processor 110 and provides a video signal to a video monitor for the host system. Graphics controller 150 may be implemented, for example, by a super VGA graphics controller available from various vendors, such as Cirrus Logic, S3, or Trident Microsystems. Multimedia processor 110 generates and stores pixel maps in local memory 120 from which graphics controller 150 generates a video signal for the video monitor.

Audio ADC 142 and audio DAC 144 are for input and output of analog audio signals. In accordance with one aspect of the invention, multimedia card 100 emulates the functions of a sound card, such as the popular "SoundBlaster", and implements sound synthesis functions such as wavetable synthesis and FM synthesis. For sound card emulations, an application program executed by the host computer provides data representing a sound, and multimedia processor 110 generates sound amplitudes in accordance with that data. Audio DAC 144 converts the sound amplitudes to an analog audio signal for a speaker or amplifier. Multimedia processor 110 similarly handles input audio signals from audio ADC 142.

Communication ADC 146 samples an analog signal from a telephone line and provides digitized samples to multimedia processor 110. How multimedia processor 110 processes the digitized samples depends on the function implemented in firmware. For example, multimedia processor 110 can implement modem functions by executing programs in firmware that perform V.34 demodulation of the samples and V.42bis error correction and decompression. Multimedia processor 110 can also compress data received from the host computer and generate digital samples representing a correctly modulated analog signal for transmission by communications DAC 148. Similarly, multimedia processor 110 can implement answering machine, facsimile, or videophone functions using the same hardware (ADC 146 and DAC 148) as the interface with telephone lines if suitable firmware or software is available.

Figure 2:
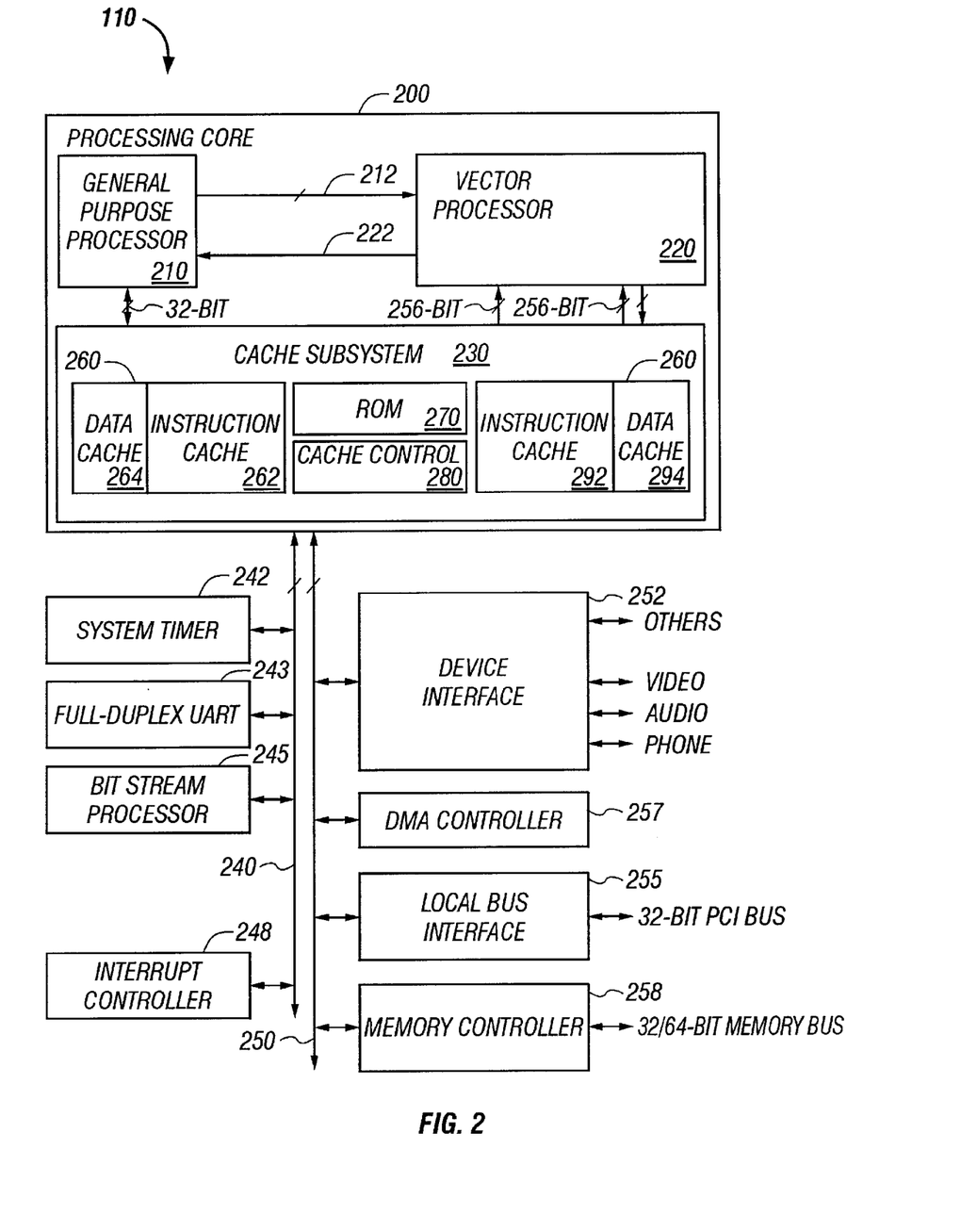
FIG. 2 shows a block diagram of a multimedia signal processor in accordance with an embodiment of the invention.

FIG. 2 shows a block diagram of an embodiment of multimedia processor 110. Multimedia processor 110 includes a processing core 200 which contains a general purpose processor 210 and a vector processor 220. As used here, the term vector processor refers to a processor which executes-instructions having vector operands, i.e., operands each containing multiple data elements of the same type. Each of general purpose processor 210 and vector processor 220 executes a separate program thread and may be a scalar or superscalar processor.

In the exemplary embodiment, general purpose processor 210 is a 32-bit RISC processor which operates at 40 Mhz and conforms to the standard ARM7 instruction set. The architecture for an ARM7 RISC processor and the ARM7 instruction set is described in the ARM7DM Data Sheet available from Advanced RISC Machines Ltd. General purpose processor 210 also implements an extension of the ARM7 instructions set which includes instructions for an interface with vector processor 220. The copending patent application, entitled "System and Method for Handling Software Interrupts with Argument Passing" which was incorporated by reference above describes the extension to the ARM7 instruction set for the exemplary embodiment of the invention. General purpose processor 210 is connected to vector processor 220 by control bus 212 to carry out the extension of the ARM7 instruction set. Furthermore, interrupt line 222 is used by vector processor 220 to request an interrupt on general purpose processor 210.

Vector processor 220 has a SIMD (single-instruction-multiple-data) architecture and manipulates both scalar and vector quantities. In the exemplary embodiment, vector processor 220 consists of a pipelined RISC central processing unit that operates at 80 Mhz and has a vector register file that is 288 bits wide. Each vector register in the vector register file can contain up to 32 data elements. Table 1 shows the data types supported for data elements within a vector.

TABLE 1

| Data Type | Data Size | Interpretation |
| --- | --- | --- |
| int8 | 8 bits (Byte) | 8-bit 2's complement integer between −128 and 127. |
| int9 | 9 bits (Byte9) | 9-bit 2's complement integer between −256 and 255. |
| int16 | 16 bits (Halfword) | 16-bit 2's complement between −32,768 and 32,767. |
| int32 | 32 bits (Word) | 32-bit 2's complement integer between −2147483648 and 2147483647 |
| float | 32 bits (Word) | 32-bit floating point number conforming to the IEEE 754 single-precision format. |

Thus, a vector register can hold thirty two 8-bit or 9bit integer data elements, sixteen 16-bit integer data elements, or eight 32-bit integer or floating point elements. Additionally, the exemplary embodiment can also operate on a 576-bit vector operand spanning two vector registers.

The instruction set for vector processor 220 includes instructions for manipulating vectors and for manipulating scalars. The patent application entitled "Single-Instruction-Multiple-Data Processing in a Multimedia Signal Processor", which was incorporated by reference above, describes the instruction set for the exemplary embodiment of the invention and an architecture for implementing the instruction set.

Cache subsystem 230 contains SRAM block 260, which is shown graphically as two blocks, ROM 270 and a cache control 280. Cache subsystem 230 can configure SRAM block 260 into (i) an instruction cache 262 and a data cache 264, for general purpose processor 210, and (ii) an instruction cache 292 and data cache 294, for vector processor 220. On-chip ROM 270 which contains data and instructions for general processor 210 and vector processor 220 can also be configured as a cache. In the exemplary embodiment, ROM 270 contains: reset and initialization procedures; self-test diagnostics procedures; interrupt and exception handlers; and subroutines for soundblaster emulation; subroutines for V.34 modem signal processing; general telephony functions; 2-dimensional and 3-dimensional graphics subroutine libraries; and subroutine libraries for audio and video standards such as MPEG-1, MPEG-2, H.261, H.263, G.728, and G.723.

Figure 3:
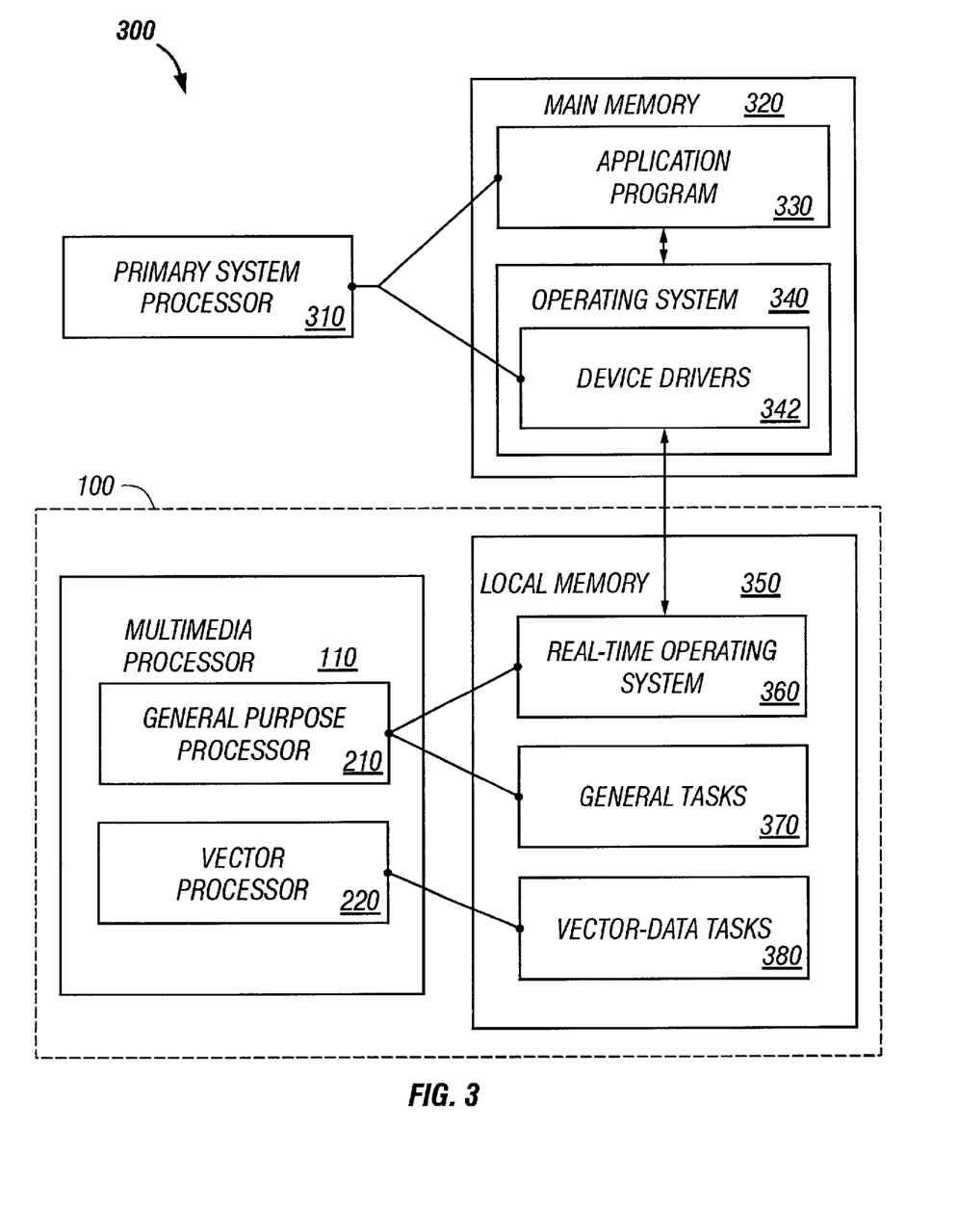
FIG. 3 illustrates relations between processors and software or firmware in a system including a multimedia processor in accordance with an embodiment of the invention.

FIG. 3 illustrates the relationships between hardware and software or firmware in an application of multimedia card 100 in a host computer system 300. Host computer system 300 has a primary processor 310 which executes programs stored in a main memory 320. In the exemplary embodiment, host computer system 300 is an IBM compatible personal computer including an x86 type microprocessor, and the programs executed by host computer system 300 include an application program 330, running under an operating system 340 such as Windows™95 or NT. Application program 330 can communicate with multimedia card 100 via device drivers 342. Device drivers 342 conform to the device driver API of the operating system.

The device drivers are typically provided with each multimedia card 100 since different embodiments of multimedia card 100 can have different hardware implementations such as differing register maps and interrupt levels. The device drivers must properly transform the control signals needed by the particular embodiment of multimedia card 100 into the control signals as defined by the device driver API of the operating system. Typically the operating system will expect a different device driver for each device such as a modem driver, a graphics driver, and an audio driver. Thus, if an embodiment of multimedia card 100 combines the functionality of an audio card, a modem, and a graphics card, three separate device drivers are typically required by the operating system.

General purpose processor 210 in multimedia processor 110 executes a real-time operating system 360 which controls communications with device drivers 342. General purpose processor 210 also performs general tasks 370. Vector processor 220 performs vector tasks 380.

Cache subsystem 230 (FIG. 2) also couples general processor 210 and vector processor 220 to two system busses: IOBUS 240 and FBUS 250. IOBUS 240 typically operates at a slower frequency than FBUS 250. Slower speed devices are coupled to IOBUS 240, while higher speed devices are coupled to FBUS 250. By separating the slower speed devices from the higher speed devices, the slower speed devices are prevented from unduly impacting the performance of the higher speed devices.

Cache subsystem 230 also serves as a switchboard for communication between IOBUS 240, FBUS 250, general processor 210, and vector processor 220. In most embodiments of cache subsystem 230, multiple simultaneous accesses between the busses and processors are possible. For example, vector processor 220 is able to communicate with FBUS 250 at the same time that general purpose processor 210 is communicating with IOBUS 240. In one embodiment of the invention, the combination of the switchboard and caching function is accomplished by using direct mapping techniques for FBUS 250 and IOBUS 240. Specifically, the devices on FBUS 250 and IOBUS 240 can be accessed by general purpose processor 210 and vector processor 220 by standard memory reads and write at appropriate addresses.

Figure 5:
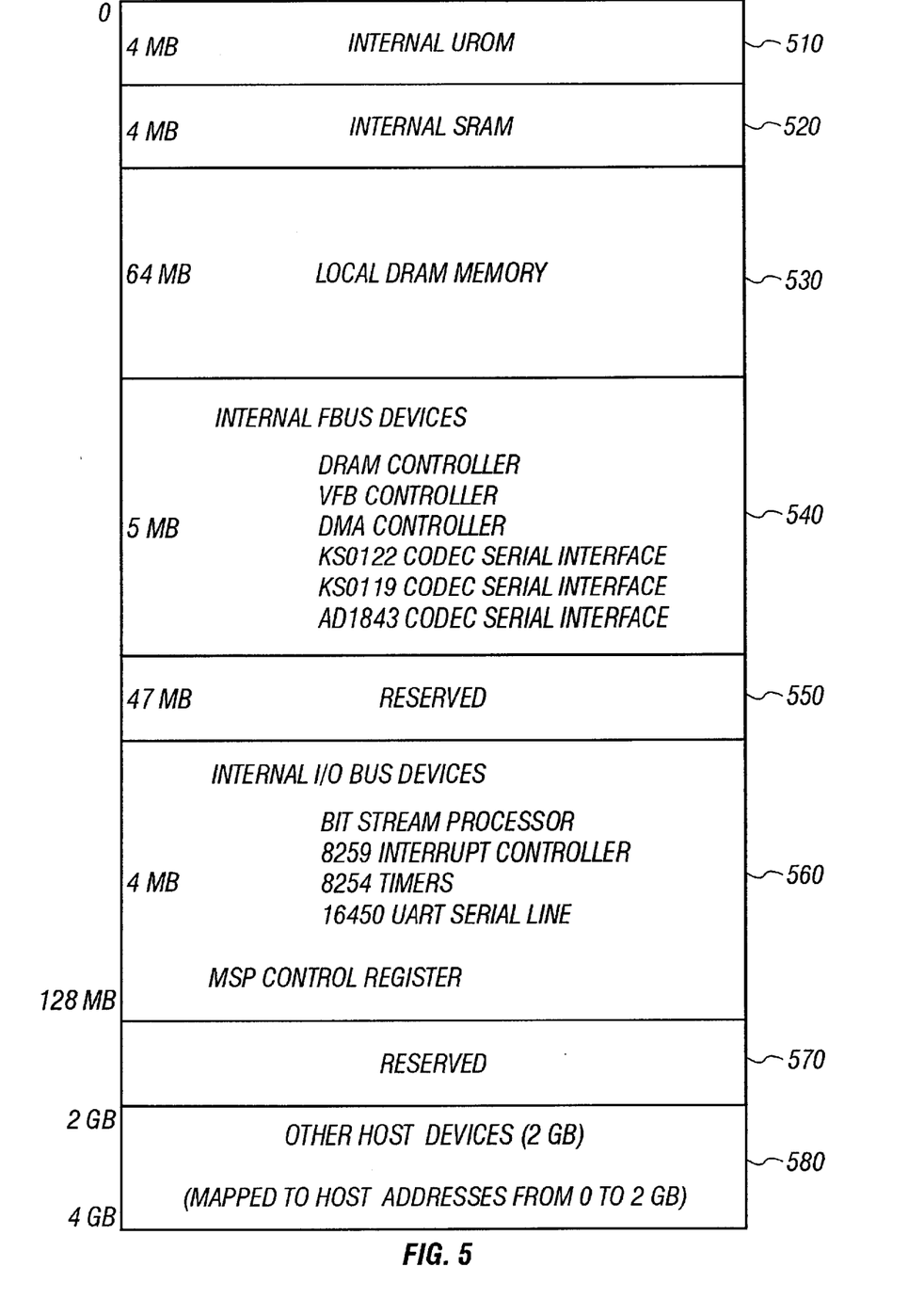
FIG. 5 shows a memory map in accordance with an embodiment of the invention.

FIG. 5 shows the memory map of one embodiment of the invention. Memory block 510, i.e. the address space from byte-address zero to address 4M-1, is occupied ROM 270. The unit M and G, which are used here for memory addresses, respectively stand for the number 1,048,576 (i.e, 1,024*1024) and 1,073,741,824(i.e., 1024*1024*1024*1024). Memory block 520, i.e. the address space from byte-address 4M to 8M-1, is occupied by SRAM block 260. Memory block 530, i.e. the address space from byte-address 8M to address 72M-1, is occupied by local memory 120. The devices on FBUS 250 are mapped to memory block 540 which starts after byte-address 72M and extends to byte-address 77M. Memory block 550 is reserved for future expansion. The devices on IOBUS 240 are mapped to memory block 560, which starts after byte-address 125M and extends to byte-address 128M-1. Memory block 570 is also reserved for future expansion. Memory block 580, i.e. the address space from byte-address 2G to address 4G-1, is occupied by other host computer devices and is typically accessed through local bus interface 255.

FBUS 250 (FIG. 2) is connected to a memory controller 258, a DMA controller 257, a local bus interface 255, and a device interface 252 which respectively provide interfaces for local memory 120, local bus 105 and converters 132, 134, 142, 144, 146, 148, and 150 shown in FIG. 1.

Memory controller 258 controls reads and writes to local memory 120. In the exemplary embodiment, memory controller 258 controls one bank of synchronous DRAMs (two 1M×16 SDRAM chips) configured to use 24 to 26 address bits and 32 data bits and having the features of: (i) a "CAS-before-RAS" refresh protocol, performed at a programmable refresh rate, (ii) partial writes that initiate Read-Modify-Write operations, and (iii) internal bank interleave. Memory controller 258 also provides a 1:1 frequency match between memory 120 and FBUS 250, manual "both bank precharge", and address and data queuing to better utilize FBUS 250. Synchronous DRAM are known to effectively operate at such frequencies (80 MHz), and standard fast page DRAMs and extended data out (EDO) DRAMs could also be used. DRAM controllers with capabilities similar to memory control 258 in the exemplary embodiment are known in the art.

DMA controller 257 controls direct memory accesses between the main memory of the host computer and the local memory of multimedia processor 200. Such DMA controllers are well known in the art. In some embodiments of the invention, a memory data mover is included. The memory data mover performs DMA from one block of memory to another block of memory.

Local bus interface 255 implements the required protocol for communications with the host computer via local bus 105. In the exemplary embodiment, local bus interface 255 provides an interface to a 33-MHz, 32-bit PCI bus. Such interfaces are well known in the art.

Device interface 252 provides a hardware interface for devices such as converters 132, 134, 142, 144, 146, 148, and 150 which would typically be on a printed circuit board with multimedia processor 110 . Device interface 252 may be customized for the particular application of multimedia processor 110 . In particular, device interface 252 might only provide an interface for specific devices or ICs. Typical units within device interface 251 provide an interface for connection of standard ADCs, DACs, or CODECs. Designs for ADC, DAC, and CODEC interfaces are well known in the art and not described further here. Other interfaces which might be employed include but are not limited to an ISDN interface for digital telephone and interfaces for busses such as for a microchannel bus. In one embodiment of multimedia processor 110, device interface 251 is a ASIC which can be programmed to perform a desired functionality.

IOBUS 240 operates at a frequency (40 MHz) that is lower than the operating frequency (80 MHz) of bus 250. Coupled to IOBUS 240 are a system timer 242, a UART (universal asynchronous receiver transceiver) 243, a bitstream processor 248, and an interrupt controller 245. System timer 242 interrupts processor 210 at scheduled intervals which are selected by writing to registers corresponding to system timer 242. In the exemplary embodiment, system timer 242 is a standard Intel 8254 compatible interval timer having three independent 16-bit counters and six programmable counter modes.

UART 243 is a serial interface, which is compatible with the popular 16450 UART integrated circuit, for use in modem or facsimile applications which requires a standard serial communication ("COM") port of a personal computer.

Bitstream processor 245 is a fixed hardware processor which performs specific functions on an input or output bitstream. In the exemplary embodiment, bitstream processor 245 performs initial or final stages of MPEG coding or decoding. In particular, bitstream processor 245 performs variable length (Huffman) coding and decoding, and packing and unpacking of video data in "zig-zag" format. Bitstream processor 245 operates in parallel with and under the control of general purpose processor 210 and vector processor 220. Processors 210 and 220 configure bitstream processor 245 via control registers. Copending U.S. patent application entitled "Methods and Apparatus for Processing Video Data", which was incorporated by reference above, describes an exemplary embodiment of bitstream processor 245.

Interrupt controller 248 controls interrupts of general purpose processor 210 and supports multiple interrupt priorities. A mask registers is provided to allow each interrupt priority to be individually masked. In the exemplary embodiment, interrupt controller 245 is programmable and implements the standard Intel 8259 interrupt system that is common in x86-based personal computers. A highest priority (level 0) interrupt is assigned to system timer 242. Priority levels 1, 2, 3, and 7 are respectively assigned to a virtual frame buffer, DMA controller 257 and device interface 252, bitstream processor 245, local bus interface 255, and UART 243. Interrupt priority levels 4, 5, and 6 are unassigned in the exemplary embodiment of the invention. The virtual frame buffer at priority level 1, which is included in some embodiments of the invention, emulates a standard VGA frame buffer.

Figure 4:
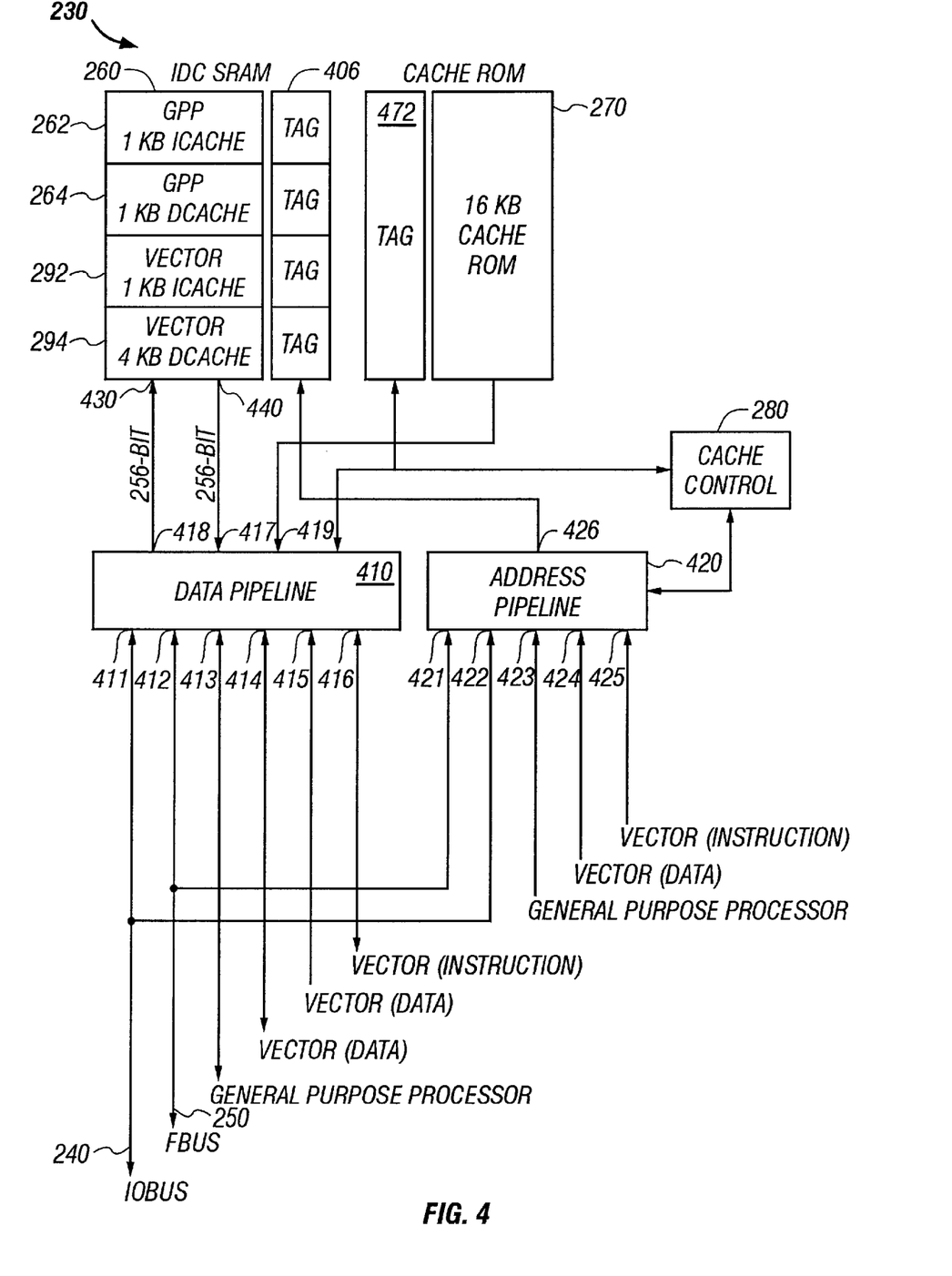
FIG. 4 shows a block diagram of a cache subsystem in accordance with an embodiment of the invention.

FIG. 4 shows a block diagram of cache subsystem 230. SRAM block 260 is divided into four memory banks to form instruction cache 262 and data cache 264 for use with general processor 210, as well as instruction cache 292 and data cache 294 for use with vector processor 220. SRAM block 260 also contains tag section 406, which is subdivided for each of the memory banks. SRAM block 260 is a dual-ported memory circuit, with read port 440 and write port 430, so that simultaneous reading and writing of SRAM block 260 is supported. Cache subsystem 230 also contains ROM cache 270, having tag field 472. As explained above ROM cache 270 contains frequently used instructions and data for general processor 210 and vector processor 220. Although tag field 472 cannot be modified, individual addresses can be marked as invalid so that data or instructions can be brought from memory to be used in place of the data or instructions in ROM 270.

Data pipeline 410 performs the data switchboard function of cache subsystem 230. Data pipeline 410 is able to create multiple simultaneous data communication paths between IOBUS 240, FBUS 250, general purpose processor 210, vector processor 220 and SRAM block 260. Similarly, address pipeline 420 performs switch board functions for addresses. In the embodiment of FIG. 4, IOBUS 240 and FBUS 250 uses time multiplexing for address and data signals. Cache control 280 provides the control lines to data pipeline 410 and address pipeline 420 to properly configure the communication channels.

In some embodiments of cache subsystem, 230 a transaction-based protocol is used to support all read and write operations. Any unit coupled to cache subsystem 230, such as general processor 210, vector processor 220, or the various devices on IOBUS 240 and FBUS 250, can place a request to cache subsystem 230. Such a request is formed by a device identification code ("device ID") and an address of the requested memory location. Each unit has a distinct device ID and cache subsystem 230 can prioritize the requests based on the device ID of the unit making the request. When the data at the requested address becomes available, cache subsystem responds with the device ID, a transaction identification code ("transaction ID"), the address, and the requested data. If the requested address is not contained in SRAM block 260 or ROM 270, cache subsystem 230 will not be able to respond to the specific request for several clock cycles while the data at the memory address is retrieved. However, while the data of a first request is being retrieved, cache subsystem 230 is able to process a second request from a different unit with a different device ID. This way, pending requests will not block subsequent requests from other units. Furthermore, cache subsystem 230 can handle a read request and a write request simultaneously in a single cycle.

As explained above, SRAM block 260 is divided into four memory banks. SRAM block 260 is dual-ported, having read port 440 and write port 430, so that in any cycle, SRAM block 260 can accept one read request and one write request. TAG section 406 of SRAM block 260 must have two read ports to support the simultaneous read and write requests. Thus the address used by read port 440 as well as the address used by write port 430 can be compared with internal cache tags for hit or miss conditions simultaneously. Tag section 406 also contains a separate write port so that as the write request at write port 430 is performed, the appropriate tag fields are also changed.

Depending on the constraints of the overall system, cache subsystem 230 can be used with either write-back or write-through cache policies. Furthermore, in some embodiments, to further increase speed, the cache line-size can be made twice the data width. In these embodiments, for "bookkeeping" purposes, each cache line must have assigned two valid bits and two dirty bits, since each cache line contains two vectors. SRAM block 260 should also globally clear all valid bits if a global clear signal is received. In other embodiments, individual clear signals are supported for each bank in SRAM block 260.

Figure 6:
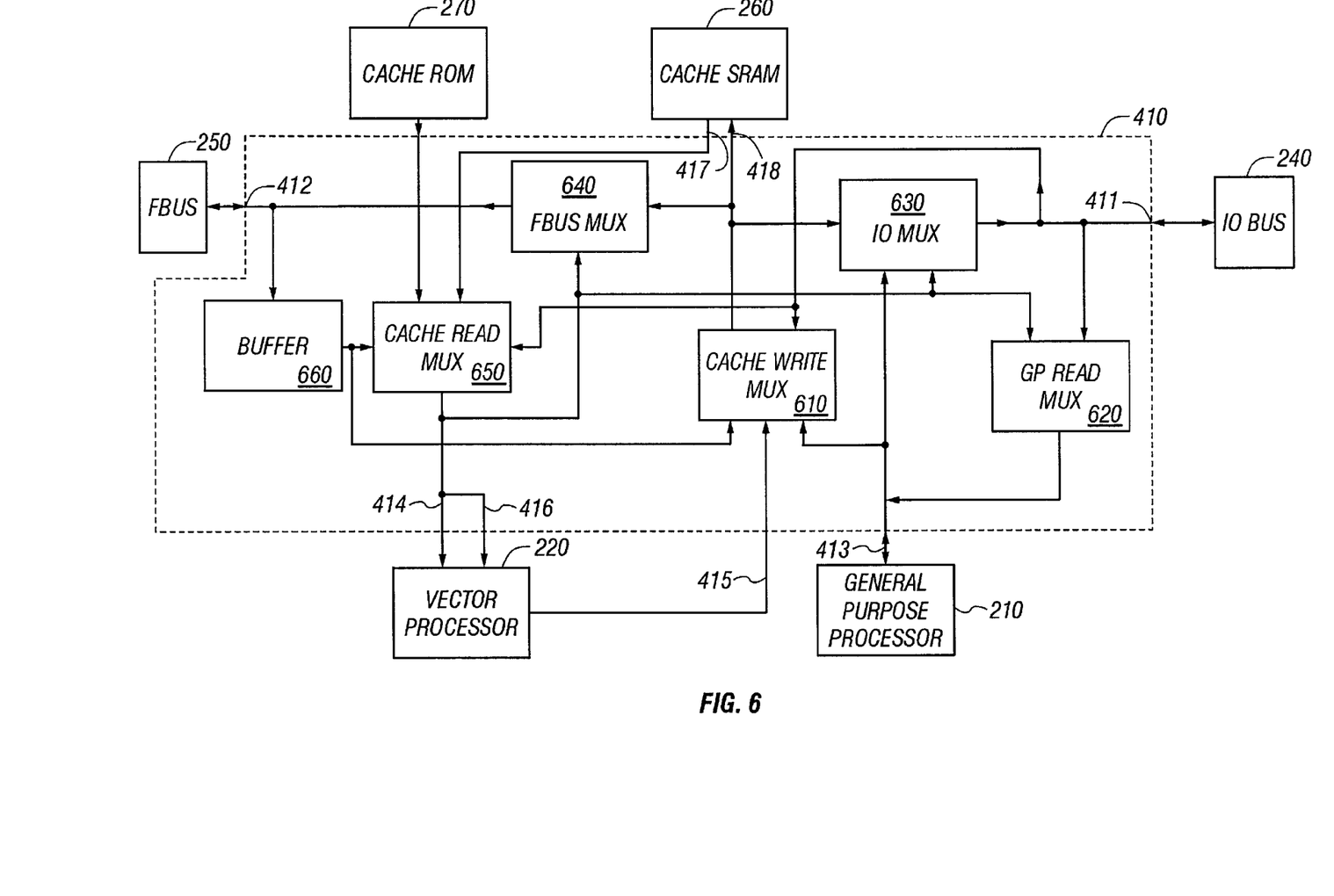
FIG. 6 shows a block diagram of a data pipeline used in a cache subsystem in accordance with an embodiment of the invention.

FIG. 6 is a block diagram of one embodiment of data pipeline 410. Since cache subsystem 230 is both a caching system and a switchboard for IOBUS 240, FBUS 250, general purpose processor 210, and vector processor 220, the busses and processor should be able to communicate either through the cache or directly if the cache is being used for by another device. The processors are generally faster than the devices on the busses; therefore, the processors will generally use the cache on writes and allow the cache write-back system to place the data to the appropriate bus device. Similarly, the processors generally request information from the cache rather than the devices directly. If the cache does not contain the requested data, the processors typically rely on the cache subsystem to retrieve the requested data into the cache and provide the data to the processors. However, when the cache is busy the processors can access the busses directly.

Data is transferred from general purpose processor 210 to IOBUS 240 through IO MUX 630. Data from IOBUS 240 to general purpose processor 210 passes through GP read MUX 620. Data is transferred from either SRAM block 260 or ROM 270 to general purpose processor 210 through cache read MUX 650 and GP read MUX 620. Data is transferred from general purpose processor 210 to SRAM block 260 through cache write MUX 610. Cache read MUX 650, cache write MUX 610, IO MUX 630 and GP read MUX 620 can be conventional multiplexers and can contain internal latches or registers as necessary for timing constraints. The selection control lines (not shown) of the multiplexers are dictated by cache control 280 (FIG. 4). Data is transferred from general purpose processor 210 to FBUS 250 through cache write MUX 610 and FBUS MUX 640. Data from FBUS 250 to general purpose processor 210 are channeled through buffer 660, cache read MUX 650, and GP read MUX 620. To perform these functions, buffer 660 can be a conventional buffer, latch, or register.

General purpose processor 210 can control vector processor 220 through control lines 212 (FIG. 2). Direct data transfer between general purpose processor 210 and vector processor 220 is generally not required but can be accomplished through SRAM block 260 or any other devices since the two processors share a common memory map.

Data from ROM 270 and SRAM block 260 to IOBUS 240 travels through cache read mux 650 and IO MUX 630. Data from IOBUS 240 to SRAM block 260 travels through cache write MUX 610. Data from IOBUS 240 to FBUS 250 passes through cache write MUX 610 and FBUS MUX 640. Data for IOBUS 240 from FBUS 250 passes through buffer 660, cache read MUX 650, and IO MUX 630. Data for IOBUS 240 from vector processor 220 passes through cache write MUX 610 and IO MUX 630. Data from IOBUS 240 to vector processor 220 passes through cache read MUX 650. In some embodiments of the invention, the direct pipeline for data from vector processor 220 to IOBUS 240 is eliminated to simplify the design of data pipeline 410. Since the bandwidth of vector processor 220 is much greater than the bandwidth of IOBUS 240, a direct communication path from vector processor 220 to IOBUS 240 becomes very inefficient with respect to processing time of vector processor 220.

Data for FBUS 250 from SRAM block 260 and ROM 270 passes through cache read mux 650 and FBUS MUX 640. Data from FBUS 250 to SRAM block 260 passes through buffer 660 and cache write MUX 610. DATA from FBUS 250 can directly reach vector processor 220 through buffer 660 and cache read MUX 650. Data for FBUS 250 can also come directly from vector processor 220 through cache write MUX 610 and F.BUS MUX 640.

Data from vector processor 220 travels to SRAM block 260 through cache write MUX 610. Data from SRAM block 260 and ROM 270 passes through cache read MUX 650 to vector processor 220.

Figure 7:
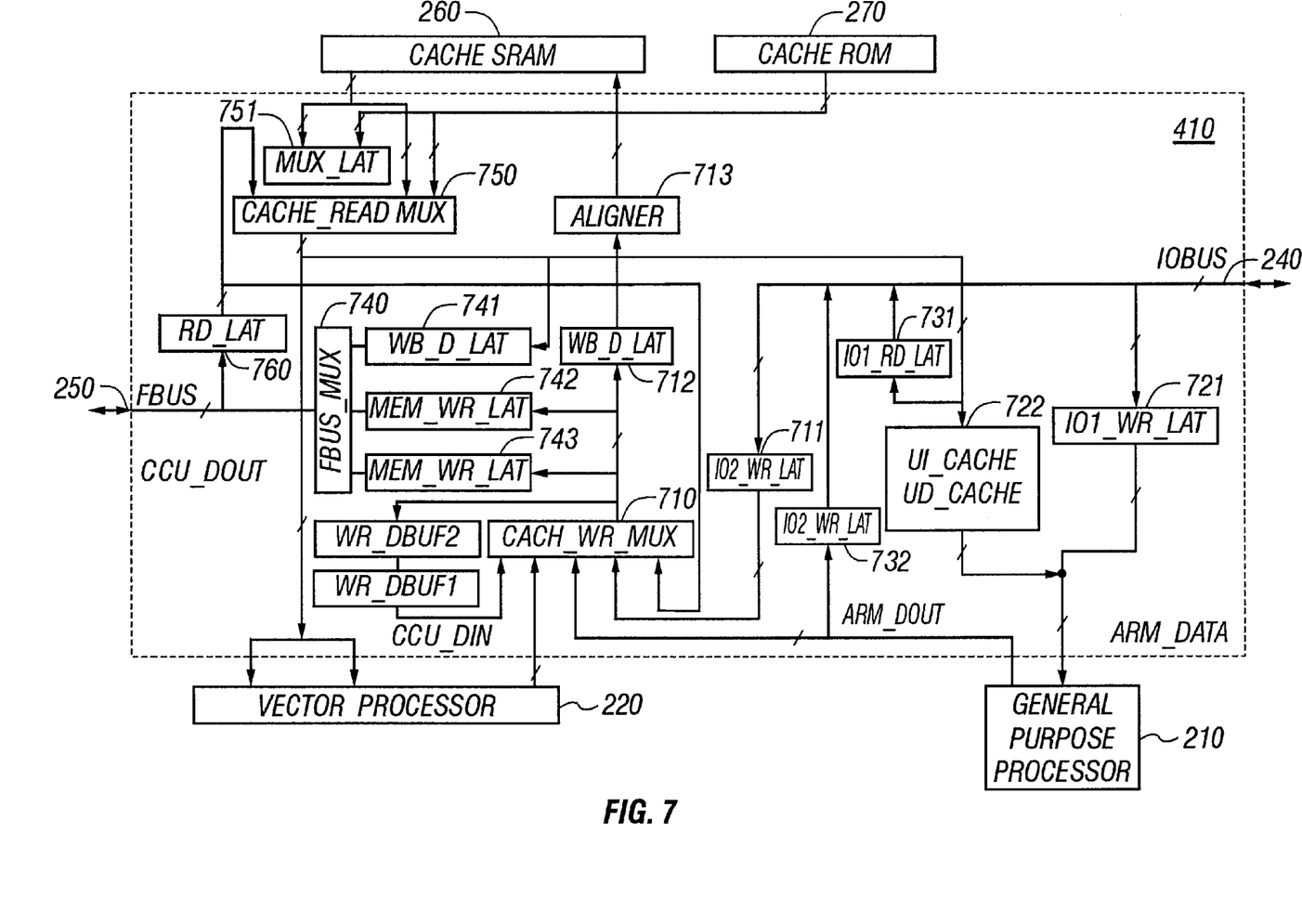
FIG. 7 shows a block diagram of a second data pipeline used in a cache subsystem in accordance with an embodiment of the invention.

FIG. 7 is a detailed block diagram of a second embodiment of data pipeline 410. Since the functionality of the embodiment of FIG. 7 is similar to the functionality of the embodiment of FIG. 6, only the differences between the embodiments are discussed in detail. However, the general organizations of the elements in each embodiment is also described. In FIG. 7, cache read MUX 650 is replaced by cache read MUX 750 and MUX latch 751. Buffer 660 is replaced with read latch 760. FBUS MUX 640 is replaced by FBUS MUX 740, write back (WB) data latch 741, memory write latch 742, and memory write latch 743. The latches in the embodiment of FIG. 7, are used to pipeline the data pipeline. Cache write MUX 610 is replaced with Cache write MUX 710, write data latch 712, aligner 713, and IO write latch 711. IO MUX 630 is replaced by IO read latch 731 and IO read latch 732. GP read MUX 620 is replaced with IO write latch 721, and microcache 722.

Microcache 722 couples the main cache, SRAM block 270 and ROM 260, to general purpose processor 210. Microcache 722 is divided into a micro-instruction cache and a micro data cache, each of which includes a tag portion 822 (FIG. 8), tag comparators, and valid bits. Microcache 722 works as a pre-fetch buffer. The address of a request from general purpose processor 210 is first compared with tag portion 822 of microcache 722. If a microcache miss occurs (i.e. no match within microcache tag 822) the address of the request with the address and other control information is sent to the main cache. To simplify microcache 722, a data write from general purpose processor 210 which matches a tag in microcache 722 invalidates the microcache address so that the written data must be sent to the main cache. In this way cache coherence can be maintained without complex write back or write through designs on microcache 722.

Figure 8:
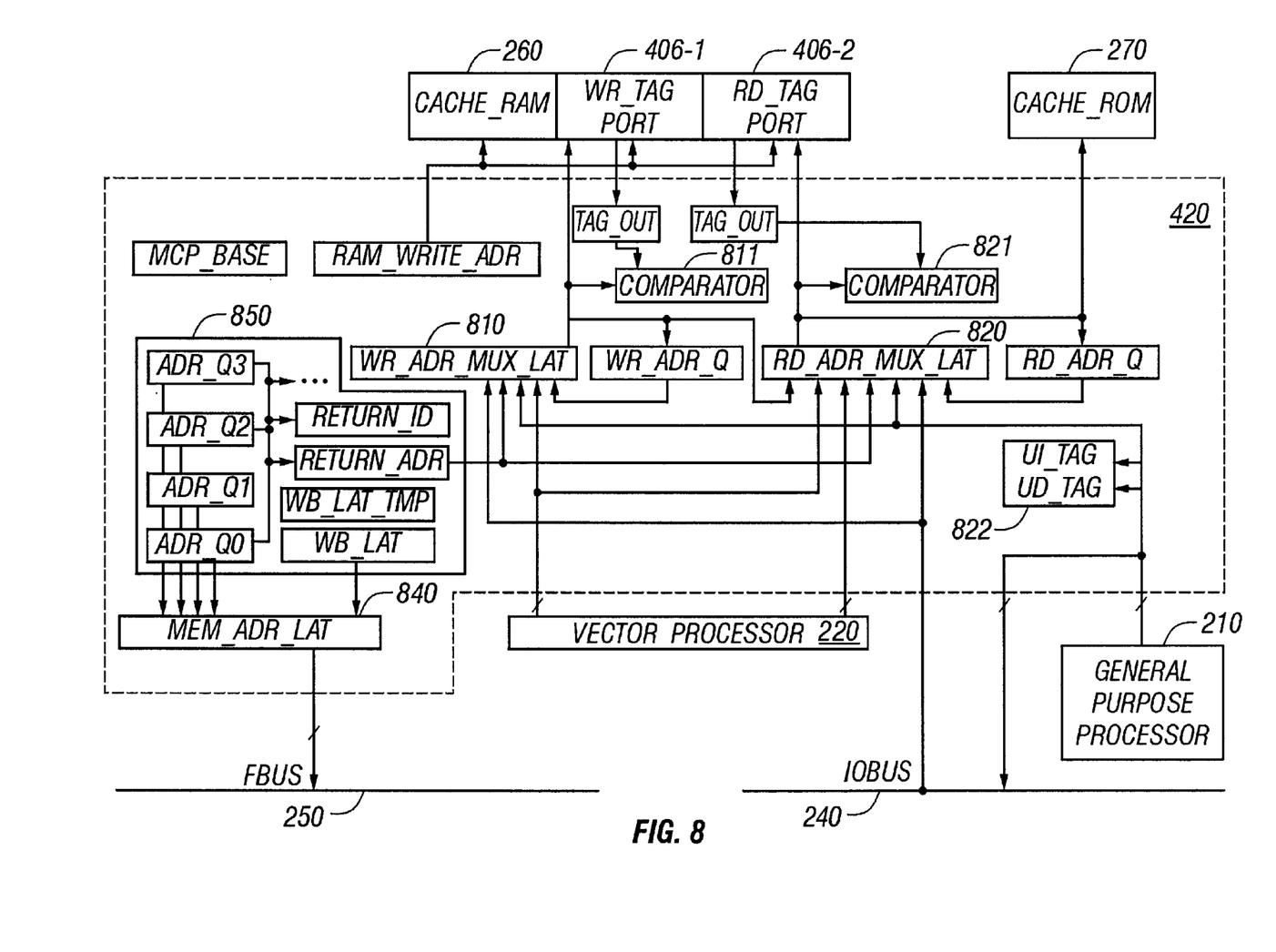
FIG. 8 shows a block diagram of an address pipeline used in a cache subsystem in accordance with an embodiment of the invention.

FIG. 8 shows a block diagram of one embodiment of address pipeline 420. FBUS interface 850 is composed of a four entry address queue and a write back latch. FBUS interface 850 can simultaneously support a pending read from instruction cache 262, a pending read from instruction cache 292, a write request from data cache 264, and a write request from data cache 294. The addresses for write requests are sent to write address MUX 810, while the addresses for read requests are sent to read address MUX 820. Cache control 280 (FIG. 2) performs arbitration between requests from general purpose processor 210, vector processor 220, IOBUS 240, and FBUS 250 based on the device ID of the request. Cache control 280 then configures the various multiplexers of data pipeline 410 and data pipeline 420 to handle the requests. Arbitration scheme can be decided based on estimation of the importance of each device. Typically, general purpose processor 210 is given the highest priority. As explained above, cache subsystem 230 is capable of simultaneous read and write operations. Therefore, separate comparators are necessary for the read and write requests. Comparator 811 is used to compare the write address from write address MUX 810 with the addresses received through write tag port 406-1 to determine if the write address of the current request is in the cache. If the address is in the cache, the cache is updated with the new data at the matching cache location. If the address is not in the cache, the address and data is written to the cache in an unused cache location or the location least recently accessed. Eventually the data is sent to the proper direct mapped device using write back or write through cache techniques.

Comparator 821 is used to compare the read address of read requests from read address MUX 820 and the addresses received through read tag port 406-2. If a tag matches the read address, the data associated with the TAG is sent to the requesting device using data pipeline 410. As explained above, if the transaction protocol is used the data will be returned with a device ID, a transaction ID, and the requested address. If no tags match the read address, cache subsystem 230 must retrieve the requested data from the appropriate direct memory mapped device. When the requested data is retrieved, the requested data, the device ID, the transaction ID, and the address is sent to the requesting device. While the data for a first request is being retrieved, cache subsystem 230 is able to service a second read request so that a second device requiring the cache is not blocked by the first device.

The various embodiments of the structure of this invention that are described above are illustrative only of the principles of this invention and are not intended to limit the scope of the invention to the particular embodiments described. In view of this disclosure, those skilled-in-the-art can define within the scope of the present invention other implementations of data pipelines, switchboards, address pipelines, cache subsystems, multiplexers, latches, buses, processors, and use these alternative features to create a digital signal processor.

We claim:

1. An integrated digital signal processor comprising:

a processing core that includes a first processor and a cache system having a cache control, wherein the first processor accesses an address space via the cache system;

a first plurality of different types of devices coupled to at least a first interface for accessing a first device that is external to the integrated digital signal processor;

a first bus that directly connects the cache system to the first plurality of different types of devices, wherein the first interface and the first bus operate at a first clock frequency;

a second plurality of different types of devices coupled to at least a second interface for accessing a second device that is external to the integrated digital signal processor; and a second bus that directly connects the cache system to the second plurality of different types of devices, the second interface and the second bus operating at a second clock frequency that differs from the first clock frequency, wherein the cache control of the cache system serves as a switchboard for communication between the first processor and any of the first plurality of different types of devices and between the first processor and any of the second plurality of different types of devices.

2. The integrated digital signal processor of claim 1, wherein the cache system further implements communication between the first interface and the second interface.

3. The integrated digital signal processor of claim 1, wherein the processing core further comprises a second processor, and the cache system implements communication between the second processor and the first interface and between the second processor and the second interface.

4. The integrated digital signal processor of claim 3, wherein the first processor is a general purpose processor and the second processor is a vector processor having a single-instruction-multiple-data architecture.

5. The integrated digital signal processor of claim 3, wherein the cache system implements communication between either processor and any of the first plurality of different types of devices and between either processor and any of the second plurality of different types of devices.

6. The integrated digital signal processor of claim 1, wherein the first interface further comprises a memory controller, and the second interface comprises a UART.

7. An integrated digital signal processor comprising:

a general purpose processor;

a vector processor capable of operating in parallel with the general purpose processor;

a first set of input/output devices, the first set including multiple input/output devices;

a second set of input/output devices, the second set including one or more input/output devices;

a first bus directly connected to the first set of input/output devices for data transmissions within the integrated digital signal processor;

a second bus directly connected to the second set of input/output devices for data transmissions within the integrated digital signal processor; and a cache system coupled to the general purpose processor, the vector processor, the first bus, and the second bus, wherein the cache system is configurable to provide communications between the general purpose processor and the first set of input/output devices via the first bus, between the general purpose processor and the second set of input/output devices via the second bus, between the vector processor and the first set of input/output devices via the first bus, and between the vector processor and the second set of input/output devices via the second bus, wherein the first bus has a first bandwidth for transmission of data, and the first bandwidth is greater than a second bandwidth that the second bus provides for transmission of data, and wherein the vector processor has a third bandwidth for data that is greater than the second bandwidth, and the cache system comprises:

a cache memory; and a data path interconnecting the cache memory, the general purpose processor, the vector processor, the first bus, and the second bus, wherein the data path lacks a connection between the vector processor and the second bus.

8. The integrated digital signal processor of claim 7, wherein communications between the vector processor and the second data bus are via the cache memory.

9. The integrated digital signal processor of claim 8, wherein the data path directly connects the vector processor to the first data bus.

10. The integrated digital signal processor of claim 7, wherein the data path directly connects the general purpose processor to the second data bus.

* * * * *